July 1, 1958

E. PELL 2,841,756

EXCITATION CIRCUITS FOR REVERSIBLY POWERED
TRANSLATING DEVICES

Filed Nov. 26, 1954

Inventor
Eric Pell
By H R Rather
Attorney

United States Patent Office 2,841,756
Patented July 1, 1958

2,841,756

EXCITATION CIRCUITS FOR REVERSIBLY POWERED TRANSLATING DEVICES

Eric Pell, Wauwatosa, Wis., assignor to Cutler-Hammer, Inc., Milwaukee, Wis., a corporation of Delaware Application November 26, 1954, Serial No. 471,419

4 Claims. (Cl. 322—77)

This invention relates to improved excitation circuits for inductive energizing windings of reversibly powered translating devices.

Because of the unidirectional character of the output of electronic and magnetic amplifiers their application to control of appreciable amount of reversible power to the fields of exciters, generators and motors is somewhat limited. While several push-pull circuits for amplifiers have been devised to enable their supplying reversible power to the fields of such dynamo electric machines, the required power output rating of the amplifiers must be considerably in excess of the power actually consumed by the fields of these machines. The ratio of the required power output of the amplifiers to that consumed by the field windings has been in some cases on the order of 12 to 1 and on the order of 8 to 1 in the best circuits heretofore devised.

It is a primary object of the present invention to provide improved excitation circuits for the inductive energizing windings of translating devices, such as the field windings of dynamo-electric machines, requiring that the power output ratings of the amplifiers or other sources of regulable unidirectional voltage output be only on the order of four times that actually consumed in the windings.

Other objects and advantages of the invention will hereinafter appear.

The accompanying drawings illustrate preferred embodiments of the invention that will now be described in detail, it being understood that the embodiments illustrated are susceptible of modification without departing from the scope of the appended claims.

Figure 1:
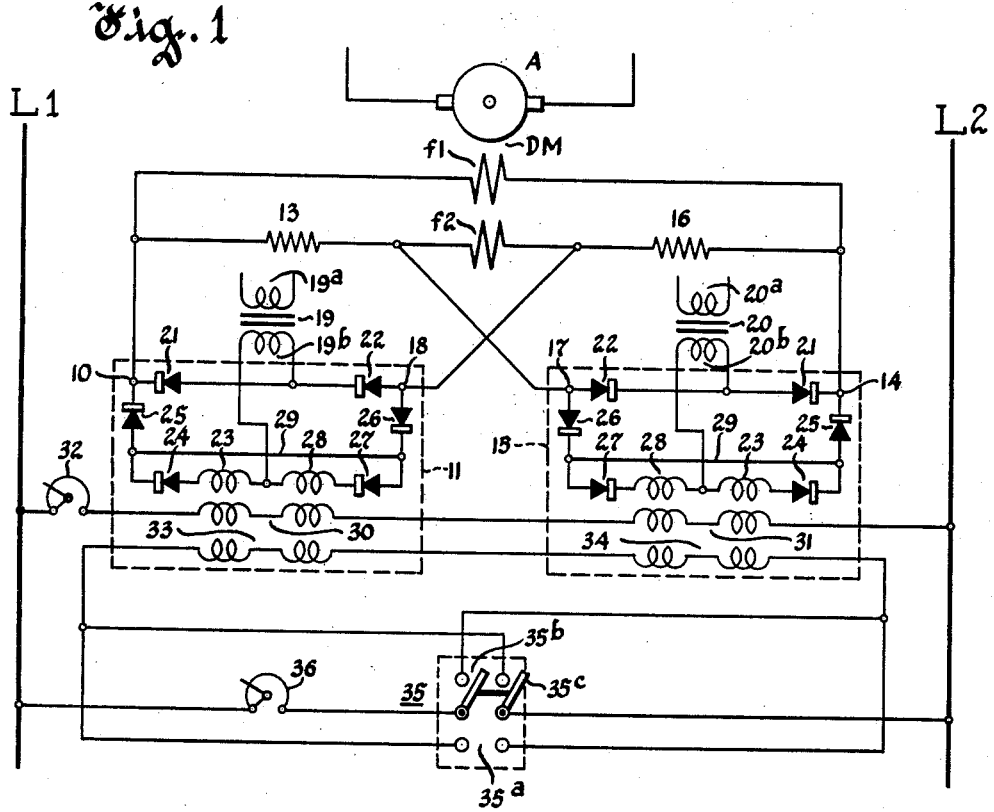
Figure 1 is a diagrammatic showing of a dynamo electric machine and an improved excitation circuit for field windings of such machine incorporating the invention.

In Fig. 1, DM generally designates a D. C. dynamo electric machine having an armature A and field windings $f1$ and $f2$. It may be assumed that these field winding sections are wound together in parallel and together provide the same number of turns as a single field winding. Winding section $f1$ is connected at one end to output terminal 10 of a magnetic amplifier 11, and winding section $f2$ is connected at its corresponding end in series with a resistor 13 to output terminal 10. At its other end winding $f1$ is connected to output terminal 14 of a magnetic amplifier 15, and winding $f2$ is connected at its other end in series with a resistor 16 to output terminal 14. The juction between resistor 13 and winding $f2$ is connected to the other output terminal 17 of amplifier 15, and the junction between winding $f2$ and resistor 16 is connected to the other output terminal 18 of amplifier 11. Resistors 13 and 16 are each preferably equal in ohmic value to that of field windings $f1$ and $f2$.

Amplifier 11 is supplied with A. C. power from a transformer 19 and amplifier 15 is similarly supplied from a transformer 20. Secondary winding $19^b$ of transformer 19 is connected at one end in series with a half-wave rectifier 21 to output terminal 10, and output terminal 18 is connected to the same end of winding $19^b$ in series with a half-wave rectifier 22. Winding $19^b$ is connected at its other end in series with an A. C. main winding 23 and half-wave rectifiers 24 and 25 to output terminal 10. Output terminal 18 is connected in series with half-wave rectifiers 26 and 27 and A. C. main winding 28 to said other end of winding $19^b$. The points common between rectifiers 26 and 27 is conected by a conductor 29 to the point common between rectifiers 24 and 25. Secondary winding $20^b$ of transformer 20 is connected to output terminals 14 and 17 of amplifier 15 in a corresponding manner and the various A. C. main windings, rectifiers, etc., have been given identical reference numerals.

Amplifiers 11 and 15 are provided with D. C. bias windings 30 and 31, respectively, which are connected across lines L1 and L2 of a source of D. C. voltage in series with an adjustable resistor 32. These amplifiers are also provided with D. C. control windings 33 and 34, respectively, which are connected at adjacent ends. At its other end, winding 33 is connected to the left-hand contact of stationary contacts $35^a$ and the right-hand contacts of stationary contacts $35^b$ of a double pole, double throw switch 35. The other end of winding 34 is connected to the right-hand contact of contacts $35^a$ and to the left-hand contact of contacts $35^b$. Switch 35 has movable contactors $35^c$ which are connected across lines L1 and L2 in series with an adjustable resistor 36.

Amplifiers 11 and 15 will have cut-off points in accordance with the adjustments of resistor 32. With contactors $35^c$ closed to contacts $35^a$ of switch 35, it may be assumed that winding 33 will be directionally energized to turn amplifier 11 on to a degree determined by the adjustment of resistor 36. It may also be assumed that winding 34 will be directionally energized so that amplifier 15 will be turned full-off. With contactors $35^c$ closed to contacts $35^b$, it may be assumed that amplifier 15 is turned on and amplifier 11 will be turned full-off.

As will be understood, where it is desired to control the output of amplifiers 11 and 15 in response to a signal variable in accordance with changes in load or other conditions imposed on machine DM, such amplifiers would each be provided with signal control windings which would provide ampere turns acting differentially with respect to the ampere turns provided by the windings 33 and 34 thereof, to vary the output of such amplifiers. Such windings have been omitted from the disclosure of Fig. 1 for the sake of simplicity.

If amplifier 11 is turned on and amplifier 15 turned full-off, current will flow from output terminal 10 of amplifier 11 through field winding $f1$ and resistor 16 to output terminal 18, and similarly current will flow from output terminal 10 through resistor 13 and field winding $f2$ to output terminal 18. Conversely, if amplifier 15 is turned on and amplifier 11 is turned full-off, current will flow from output terminal 14 through field winding $f1$ and through resistor 13 to output terminal 17, and similarly current will flow from output terminal 14 through resistor 16 and field winding $f2$ to output terminal 17. Reversal of the direction of current flow through field windings $f1$ and $f2$ will of course cause reversal in the direction of rotation of machine DM, if it be a motor, or cause reversal in polarity of its armature voltage if it be a generator or exciter.

Figure 2:
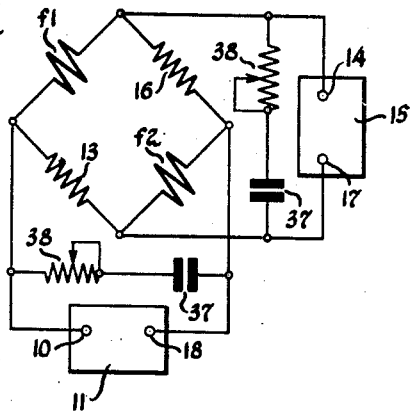
Fig. 2 is a diagrammatic view of a modified form of the invention.

Even though field windings $f1$ and $f2$ are alike and resistors 13 and 16 are of equal to each in ohmic value, not all of the current flowing between the output terminals of a turned-on amplifier will flow through the field windings $f1$ and $f2$. Due to the fact that the current output of the amplifier is not pure D. C., but is of pulsating character, some of the current will by-pass field windings $f1$ and $f2$ and flow through either resistor 13 or 16, and the rectifiers of the turned-off amplifier back to the return output terminal of the turned-on amplifier. In order to improve the efficiency of the circuit, the system depicted in Fig. 2 has been devised, wherein filter circuits, comprising a capacitor 37 and adjustable resistor 38 are connected in series across the output terminals of each of the amplifiers 11 and 15. These filter circuits help to provide output current that more closely approaches pure D. C. in form, and hence causes less of the output current of a turned-on amplifier to be by-passed around field winding sections $f1$ and $f2$ through the rectifiers of the turned-off amplifier.

Figure 3:
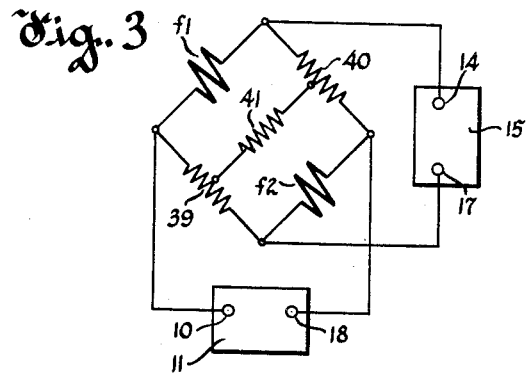
Fig. 3 is like Fig. 2, but shows another modified form of the invention.

Fig. 3 depicts another modified form for improving the efficiency of current flow through windings $f1$ and $f2$. In this form center-tapped resistors 39 and 40 are substituted for resistors 13 and 16, respectively, and a discharge resistor 41 is connected across the center taps of resistors 39 and 40. The current supplied by the turned-on amplifier will, because of the inductance of the field windings, find it easier on the increase slope of the rectified current wave to pass through the rectifiers of the turned-off amplifiers, but on the decaying side or slope of the current wave the energy built-up in the field windings cannot pass through the last mentioned rectifiers. Thus the resistor 41 provides a discharge path for both of the field windings and improves the amplifier output current flow through these windings.

Figure 5:
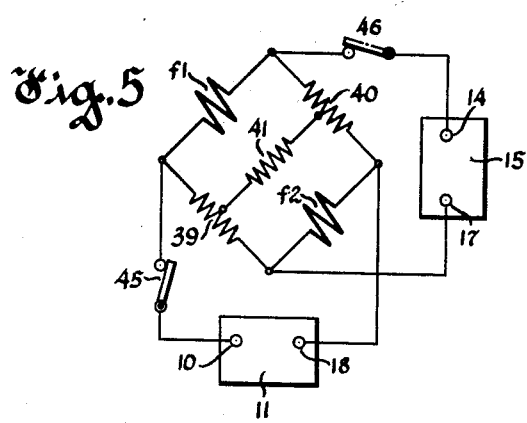
Fig. 5 shows a fourth modified form of the invention.

The modified form of Fig. 5 is like the form of Fig. 3 except for the additional inclusion of a switch 45 in the connection between output terminal 10 of amplifier 11 and the junction between field winding $f1$ and resistor 39, and the similar inclusion of a switch 46 in the connection between output terminal 14 and the junction between field winding $f1$ and resistor 40. It is contemplated that with amplifier 11 turned on and amplifier 15 turned off switch 45 will be closed and switch 46 will be opened, thus preventing the short circuiting of current through the rectifiers of amplifier 15. Similarly with amplifier 15 turned on and amplifier 11 turned-off switch 46 will be closed and switch 45 will be opened preventing the short circuiting of current through the rectifiers of amplifier 11. During quick reversing or plugging operation, with the previously turned-off amplifier suddenly turned on and the previously turned-on amplifier suddenly turned off, discharge resistor 41 provides a discharge path for the stored magnetic energy of windings $f1$ and $f2$. For slow reversing applications, discharge resistor 41 can be dispensed with.

Figure 4:
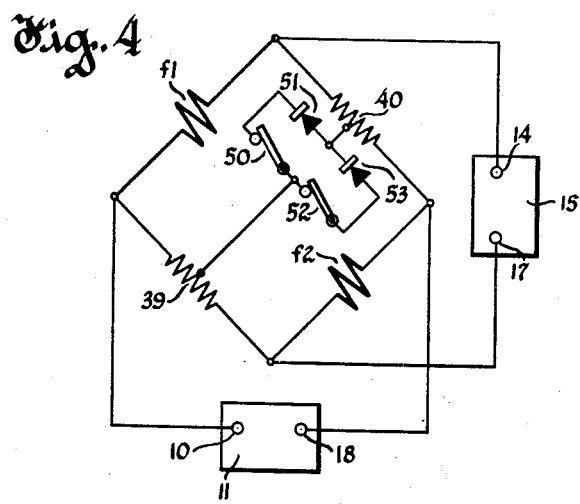
Fig. 4 shows a third modified form of the invention.

In the modified form of Fig. 4, the center taps of resistors 39 and 40 are interconnected through a switch 50 and half-wave rectifier 51 connected in series with switch 50 and also through a switch 52 and a half-wave rectifier 53 connected in series with switch 52. Rectifiers 51 and 53 are connected in the opposed conducting relation shown. With amplifier 11 turned on and amplifier 15 turned off switch 50 would be closed and switch 52 opened thereby insuring that more current will flow through windings $f1$ and $f2$. Conversely with amplifier 15 turned on and amplifier 11 turned off switch 52 will be closed and switch 50 opened to secure similar increased current flow through windings $f1$ and $f2$ in the reverse direction. Under steady state conditions this form shows higher efficiency than either of the forms of Figs. 3 and 5 as it eliminates current drain through a discharge resistor.

Any of the aforedescribed forms can be improved upon from a current distribution standpoint by substituting inductors for the resistors connected between the ends of the field windings, such inductors preferably having the same inductive reactance and ohmic resistance as windings $f1$ and $f2$. Electronic amplifiers can also be used in place of the magnetic amplifiers here disclosed, and the windings $f1$ and $f2$ can be inductive control or regulating windings of translating devices other than dynamo electric machines.

I claim:

1. In combination, a translating device having a pair of inductive regulating windings, a pair of center tap resistors connected in a bridge circuit with said windings and disposed in alternate legs thereof, two parallel series groups, each comprising a switch and a half-wave rectifier connected between the center taps of said resistors with the rectifiers connected in opposed conducting relation with respect to the other, and a pair of unidirectional voltage sources, one of which has its output connected across one pair of diagonally opposite junctions of said bridge circuit and the other of which has its output connected across the other pair of diagonally opposite junctions of said bridge circuit.

2. In combination, a dynamoelectric machine having a pair of shunt field windings, a pair of center tap resistors connected in a bridge circuit with said field windings and disposed in said alternate legs thereof, an impedance element connected between the center taps of said resistors, and a pair of amplifiers of the unidirectional output type, one of which has its output terminals connected across one pair of diagonally opposite junctions of said bridge circuit and the other of which has its output terminals connected across the other pair of diagonally opposite junctions of said bridge circuit.

3. The combination according to claim 2 wherein said impedance element is a resistor.

4. A combination according to claim 3 wherein a switch is in the connections between the output terminals of each said amplifiers and said bridge circuit.

References Cited in the file of this patent

UNITED STATES PATENTS

| | | |
|---|---|---|
| 2,629,847 | Eames et al. | Feb. 24, 1953 |
| 2,677,088 | Malick | Apr. 27, 1954 |
| 2,688,723 | Kadushin et al. | Sept. 7, 1954 |